US009696961B2

(12) United States Patent
Cellier et al.

(10) Patent No.: US 9,696,961 B2
(45) Date of Patent: *Jul. 4, 2017

(54) SONG SELECTION USING A HEART RATE CHANGE AND A FACIAL EXPRESSION MONITORED WITH A CAMERA

(71) Applicant: International Business Machines Corporation, Armonk, NY (US)

(72) Inventors: Caitlin E. Cellier, Hopewell Junction, NY (US); Eli M. Dow, Wappingers Falls, NY (US); Jessie Yu, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/921,195

(22) Filed: Oct. 23, 2015

(65) Prior Publication Data

US 2017/0060521 A1    Mar. 2, 2017

Related U.S. Application Data

(63) Continuation of application No. 14/842,041, filed on Sep. 1, 2015.

(51) Int. Cl.
| | | |
|---|---|---|
| *G06F 17/00* | (2006.01) | |
| *G06F 3/16* | (2006.01) | |
| *G06K 9/00* | (2006.01) | |
| *G06F 17/30* | (2006.01) | |

(52) U.S. Cl.
CPC ........ *G06F 3/165* (2013.01); *G06F 17/30749* (2013.01); *G06K 9/00302* (2013.01)

(58) Field of Classification Search
CPC ......... G06F 17/30032; G06F 17/30044; G06F 17/30764; G06F 2203/011; G06F 3/0304
See application file for complete search history.

(56) References Cited

U.S. PATENT DOCUMENTS

2009/0116684 A1    5/2009   Andreasson
2010/0321519 A1   12/2010   Bill
(Continued)

OTHER PUBLICATIONS

Appendix P "List of IBM Patents and Patent Applications Treated as Related" filed Oct. 23, 2015; pp. 2.
(Continued)

*Primary Examiner* — Thomas Maung
(74) *Attorney, Agent, or Firm* — Edward P. Li

(57) ABSTRACT

A method, a computer program product, and a computer system for selecting songs using a heart rate change, a blood pressure change, and a facial expression of a listener. A computer receives a song from a music source selected by a listener and determines whether the song is appropriate. The computer starts to play the song, in response to determining that the song is appropriate. A camera connected to the computer detects a facial expression of the listener. The computer determines whether the facial expression is positive. In response to determining that the facial expression is positive, the computer the song in full. The camera connected to the computer detects a heart rate change and a blood pressure change of the listener. The computer tags the song with updated information.

5 Claims, 4 Drawing Sheets

(56) References Cited

U.S. PATENT DOCUMENTS

| | | | | |
|---|---|---|---|---|
| 2011/0295843 | A1* | 12/2011 | Ingrassia, Jr. | G06F 17/30053 707/723 |
| 2014/0119563 | A1* | 5/2014 | Caskey | G06F 17/30764 381/86 |
| 2016/0292270 | A1* | 10/2016 | Negi | G06F 3/011 |

OTHER PUBLICATIONS

Lesiuk, Teresa; "The effect of music listening on work performance"; Psychology of Music, Sage Publication; Copyright © 2005, Society for Education, Music and Psychology Research; vol. 33, No. 2; pp. 173-191.

"Creating Playlists Using Autonomic User Input"; An IP.com Prior Art Database Technical Disclosure; IP.com No. IPCOM000223662D; IP.com Electronic Publication: Nov. 21, 2012; pp. 1-2.

Bartlett, Marian et al.; "Measuring facial expressions by computer image analysis", Psychophysiology, 36; 1999; pp. 253-263; Cambridge Univeristy Press; Copyright 1999 Society for Psychophysiological Research.

Wang, Matthew et al.; "Determining Mood from Facial Expressions"; CS 229 Project; Fall 2014; pp. 1-5.

U.S. Appl. No. 14/842,041, filed Sep. 1, 2015 entitled "Song Selection Using a Heart Rate Change and a Facial Expression Monitored with a Camera".

Balakrishnan et al., "Detecting Pulse from Head Motions in Video", IEEE Conference on Computer Vision and Pattern Recognition, 2013, © IEEE, pp. 3430-3437.

Julien, Claude, "The enigma of Mayer waves: Facts and models", Cardiovascular Research, 70, (2006), pp. 12-21, © 2005 European Society of Cardiology, Published by Elsevier B.V.

Myers, Christopher, "A Model for the Genesis of Arterial Pressure Mayer Waves from Heart Rate and Sympathetic Activity", Boston University Computer Science Department, Apr. 2001, Technical Report CAS/CNS-01-005, Copyright © 2001, 27 Pages.

Wu et al., "Eulerian Video Magnification for Revealing Subtle Changes in the World", ACM Transactions on Graphics, vol. 31, No. 4, Article 65, Publication Date: Jul. 2012, pp. 65:1- 65:8.

\* cited by examiner

US 9,696,961 B2

SONG SELECTION USING A HEART RATE CHANGE AND A FACIAL EXPRESSION MONITORED WITH A CAMERA

CROSS REFERENCE TO RELATED APPLICATION

This application is a Continuation Application of pending U.S. patent application Ser. No. 14/842,041 filed on Sep. 1, 2015.

BACKGROUND OF THE INVENTION

The present invention relates generally to computer implemented analytics for music selection, and more particularly to song selection using a heart rate change and a facial expression of a listener monitored with a camera such as a webcam.

The introduction of more portable and accessible music has led many people to incorporating music into their work environments. Music can block out noisy distractions of an office and can also keep a listener motivated, focused, and released from stress. The key to optimum productivity is finding music that can best keeps the listener motivated, focused, and relieved from stress. However, to find appropriate music for optimizing productivity is time consuming; the spent time for finding the appropriate music may negate the benefits the music can provide.

SUMMARY

In one aspect, a method for selecting songs using a heart rate change, a blood pressure change, and a facial expression of a listener is provided. The method is implemented by a computer. The method comprises receiving a song from a music source selected by a listener; determining whether the song is appropriate, based on clock information, a current heart rate and a current blood pressure detected by a camera connected to the computer, and a target of a heart rate and a blood pressure for the listener; starting to play the song, in response to determining that the song is appropriate; detecting, by the camera connected to the computer, a facial expression of the listener; determining whether the facial expression is positive; playing the song in full, in response to determining that the facial expression is positive; detecting, by the camera connected to the computer, a heart rate change and a blood pressure change of the listener; and tagging the song with updated information.

In another aspect, a computer program product for selecting songs using a heart rate change, a blood pressure change, and a facial expression of a listener is provided. The computer program product comprises a computer readable storage medium having program code embodied therewith. The program code is executable to: receive a song from a music source selected by a listener; determine whether the song is appropriate, based on clock information, a current heart rate and a current blood pressure detected by a camera connected to the computer, and a target of a heart rate and a blood pressure for the listener; start to play the song, in response to determining that the song is appropriate; detect, by the camera connected to the computer, a facial expression of the listener; determine whether the facial expression is positive; play the song in full, in response to determining that the facial expression is positive; detect a heart rate change and a blood pressure change of the listener; and tag the song with updated information.

In yet another aspect, a computer system for selecting songs using a heart rate change, a blood pressure change, and a facial expression of a listener is provided. The computer system comprises one or more processors, one or more computer readable tangible storage devices, and program instructions stored on at least one of the one or more computer readable tangible storage devices for execution by at least one of the one or more processors. The program instructions are executable to receive a song from a music source selected by a listener. The program instructions are executable to determine whether the song is appropriate, based on clock information, a current heart rate and a current blood pressure detected by a camera connected to the computer, and a target of a heart rate and a blood pressure for the listener. The program instructions are executable to start to play the song in response to determining that the song is appropriate. The program instructions are executable to detect, by the camera connected to the computer, a facial expression of the listener. The program instructions are executable to determine whether the facial expression is positive. The program instructions are executable to play the song in full in response to determining that the facial expression is positive. The program instructions are executable to detect a heart rate change and a blood pressure change of the listener. The program instructions are executable to tag the song with updated information.

DETAILED DESCRIPTION

Embodiments of the present invention discloses a system for selecting songs using a heart rate change, a blood pressure, and a facial expression of a listener. Using a camera such as a webcam on a laptop, the system measures the heart rate change of the listener in a workplace, and dynamically choose songs that help the listener achieve and maintain the perfect work focus balance. By detecting the facial expression of the listener with the camera, the system also detects whether the listener wishes to skip a song. The system may pause the song if the listener leaves the workplace. The system allows the listener to stay focused on work without having to switch the focus to managing the music.

The system uses the combination of facial expression recognition and image processing to determine the heart rate and the blood pressure; therefore, the listener does not need to leave his/her work screens to change or skip songs. By certain expressions, the listener can dictate a song to be skipped or validate that they enjoy the particular type of song that is playing. The system can even pause the music when a listener leaves his/her desk (for example, he/she needs to leave quickly for a meeting), saving his/her time scrambling to find the window playing music from his/her work windows. At the end of a work session, the system can capture listener's feedback about when he/she is the most focused; therefore, the system can use the feedback to further tailor music choices and expressions to the listener.

Music listening is an increasing occurrence in workplaces and, through the system, the natural trend can be harnessed to improve overall work productivity while potentially promoting happier work environments. The system can also be used in areas other than workplaces, for example in gaming. Many gamers prefer to listen to their own custom music over the game music. By measuring the gamer's heart rate, the system can provide songs tailored to the gamer. When the gamer's heart rate is high, if the gamer is playing a fast paced action game, more intense songs to match the mood can be played; conversely, if the gamer is more relaxed (i.e., if the gamer is playing an adventure game), the system will play a more relaxed song to match the mood. The heart rate balancing song selection method may also be applicable either by making a frustrated gamer more relaxed or improve a boring game.

Figure 1:
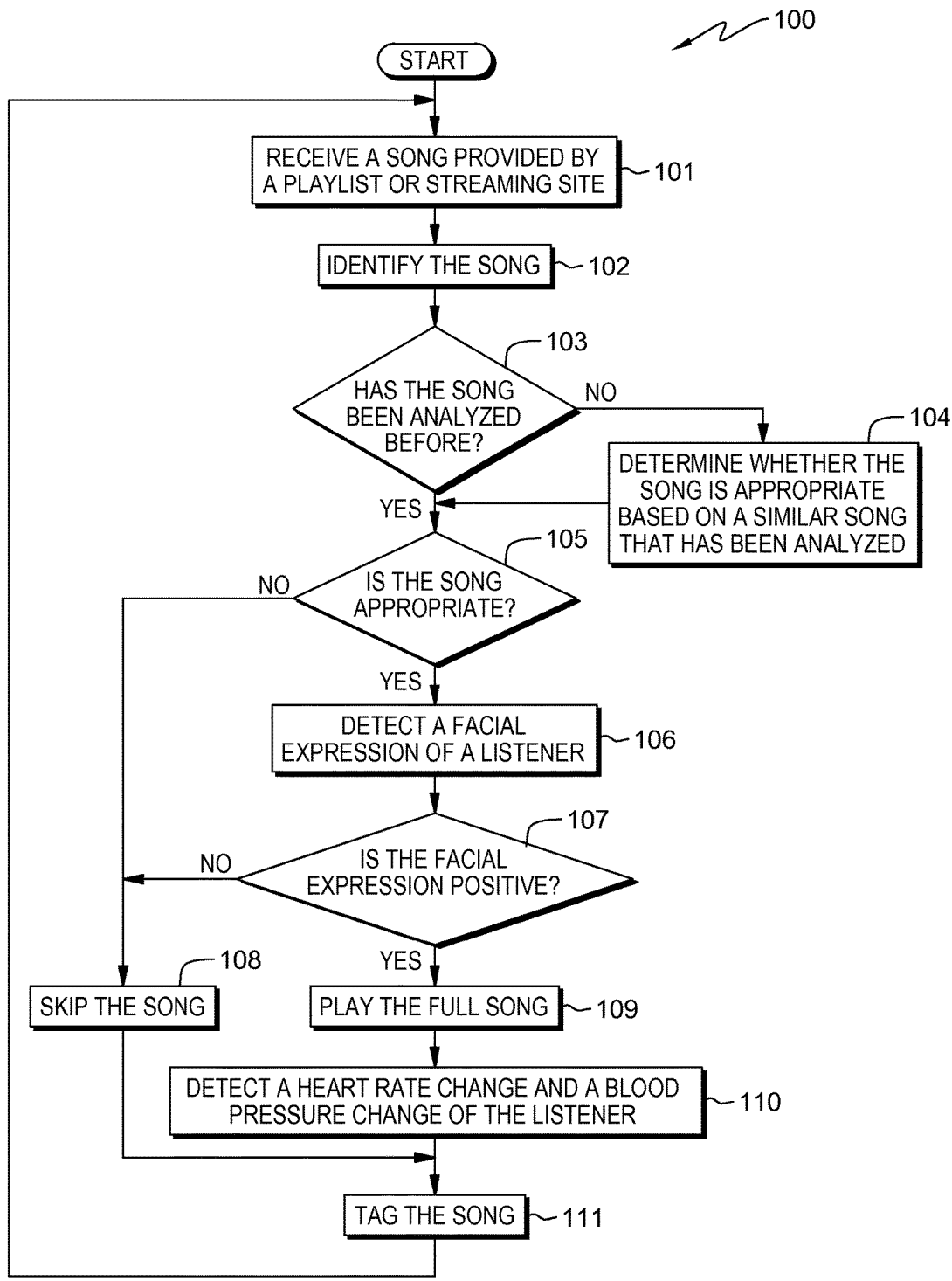
FIG. 1 is a flowchart showing operational steps for selecting songs using a heart rate change, a blood pressure change, and a facial expression of a listener, in accordance with one embodiment of the present invention.

FIG. 1 is flowchart 100 showing operational steps for selecting songs using a heart rate change, a blood pressure change, and a facial expression of a listener, in accordance with one embodiment of the present invention. At step 101, a computer (showing in FIG. 4) receives a song provided by a music source, a playlist or a streaming site. First, the song is provided by any playlist or streaming site a listener chooses. By using a large playlist provided by the listener or a streaming site which tailors music to the listener's listening preference, the system not only be ensured to play the most appropriate song to match their target work rate but also plays songs that the user enjoys putting them in a more positive mood. At step 102, the computer identifies the song. From the song details, the computer retrieves previous metadata on a heart rate change and a feedback of the listener, if the song has been played. If no metadata has ever been captured, the computer may use a music analyzer to either find a song whose results have been captured or make standard decisions based on the heart rate change or mood of the song.

At step 103, the computer determines whether the song has been analyzed before. In response to determining that the song has not been analyzed before (NO branch of step 103), the computer at step 104 determines whether the song is appropriate for a current situation based on a similar song that has been analyzed. After step 104 or in response to determining that has been analyzed before (YES branch of step 103), the computer at step 105 determines whether the song is appropriate for a current situation, based on clock information, a current heart rate and a current blood pressure detected by a camera connected to the computer, and a target of a heart rate and a blood pressure for the listener.

In response to determining that the song is appropriate for a current situation (YES branch of step 105), the computer at step 106 detects a facial expression of the listener. The facial expression provides an important behavioral measure for studding emotion of the listener. The facial expression is detected with a camera such as a webcam on the computer. At step 107, the computer determines whether the facial expression is positive. The computer analyzes the facial expression detected at step 106 and determines whether the listener has a positive mood. In response to determining that the facial expression is positive (YES branch of step 107), the computer at step 109 plays the full song.

At step 110, the computer detects a heart rate change and a blood pressure change of the listener. The heart rate change and the blood pressure change show differences of a heart rate and a blood pressure before and after listening the song. The heart rate and the blood pressure of the listener is detected by a camera such as a webcam. Existing open libraries for heart beat monitoring through webcams work best when the listener is sitting still and looking at the screen. The webcam can detect the heart rate of the listener through Eulerian Video Magnification. It can detect slight changes in the listener's forehead and facial imagery to determine the heart rate. The process can also be used to detect Mayer's waves which can be used to monitor a blood pressure as well.

In response to determining that the song is not appropriate for a current situation (NO branch of step 105) or in response to determining that the facial expression is not positive (NO branch of step 107), the computer at step 108 skips the song. The song will not be played. After step 108 or step 110, the computer at step 111 tags the song with updated metadata. Tagging the song will be discussed in detail in the next paragraphs with reference to FIG. 2.

Figure 2:
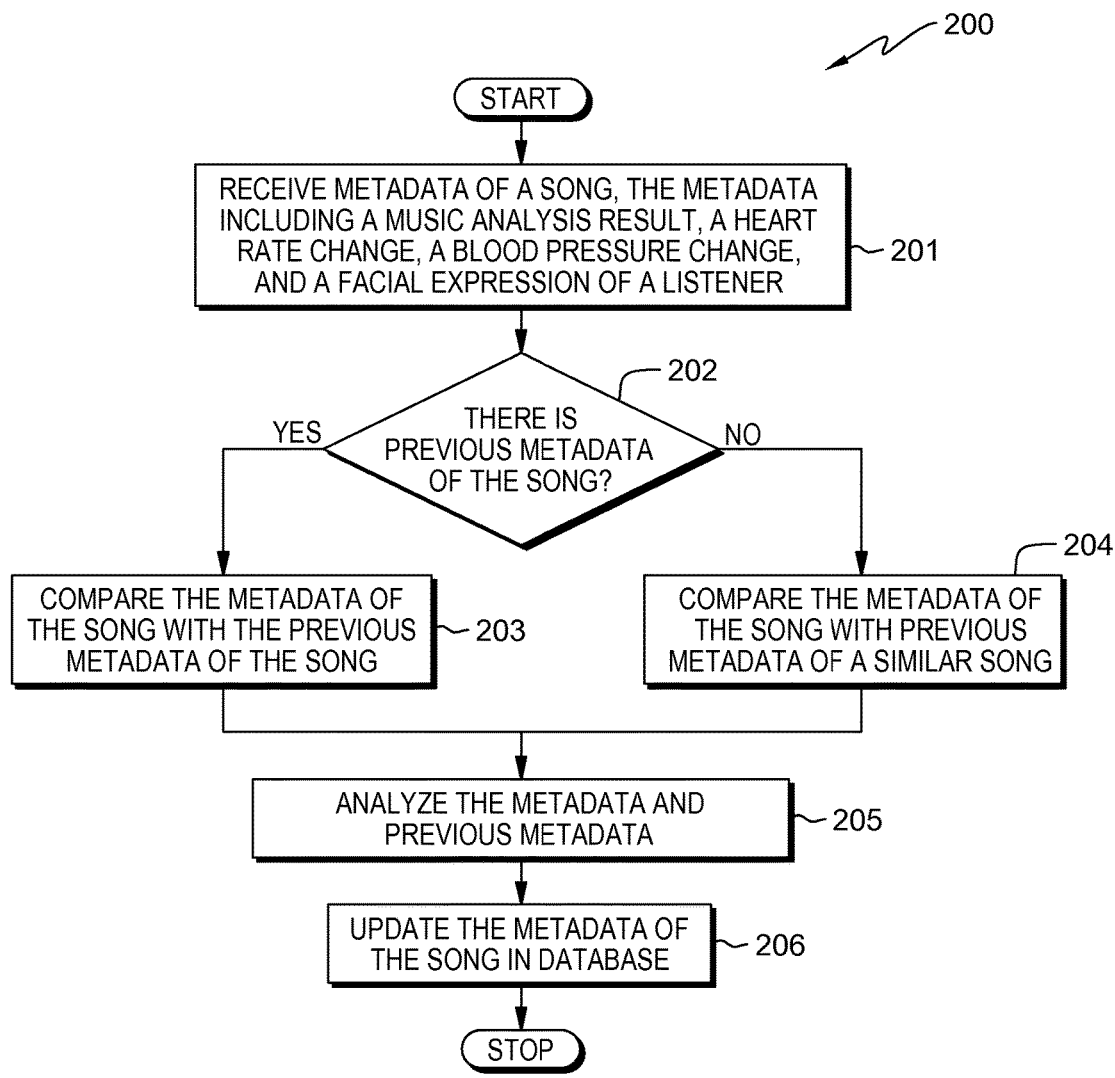
FIG. 2 is a flowchart showing operational steps for tagging a song with updated metadata, in accordance with one embodiment of the present invention.

FIG. 2 is flowchart 200 showing operational steps for tagging the song with updated metadata, in accordance with one embodiment of the present invention. At step 201, a computer receives metadata of the song. The metadata includes a music analysis result, a heart rate change of the listener, and a facial expression of listener. At step 202, the computer determines whether there is previous metadata of the song.

In response to determining that there is the previous metadata of the song (YES branch of step 202), the computer at step 203 compares the metadata of the song with the previous date of the song. In response to determining that there is no previous metadata of the song (NO branch of step 202), the computer at step 204 compares the metadata of the song with previous date of a similar song.

After step 203 or step 204, the computer at step 205 analyzes the metadata received at step 201 and the previous metadata of the song or the similar song. When the computer analyzes the song with the previous metadata the song, the computer will determine whether the song works well as the previous time and determine the reason. When the computer analyzes the song with the previous metadata the similar song, the computer will determine whether a result of the song is similar to an expected result and determine the reason. At step 206, the computer updates the metadata of the song in a database.

Figure 3:
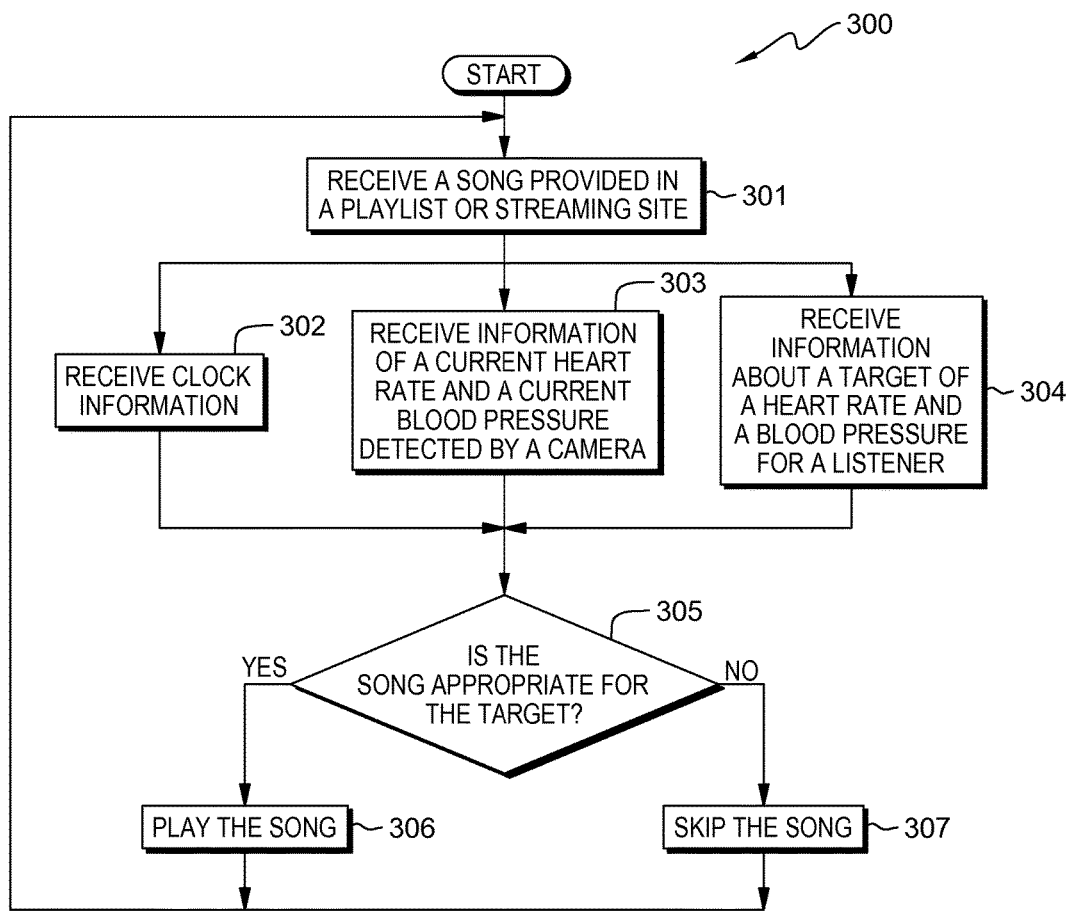
FIG. 3 is a flowchart showing operational steps for determining whether a song is appropriate, in accordance with one embodiment of the present invention.

FIG. 3 is flowchart 300 showing operational steps for determining whether a song is appropriate, in accordance with one embodiment of the present invention. At step 301, the computer receives a song provided by a playlist or a streaming site. At step 302, the computer receives clock information. The computer makes use of a clock to further optimize music to the work day. For example, faster paced adrenaline producing music may be played in the morning when the listener needs an extra boost to wake up; more relaxing soothing music may be played in the late afternoon to help prevent the listener from being burnt out by stress. At step 303, the computer receives information of a current heart rate and a current blood pressure detected by a camera such as a webcam. At step 304, the computer receives information about a target of a heart rate and a blood pressure for the listener. The target of the heart rate and the blood pressure for each listener is derived first from the gender and age of the listener and then is personalized through training as the computer learns at which heart rate and blood pressure the listener feels they are the most focused. The target of the heart rate and the blood pressure can be specified based on the time of day (for example, walking hours, work time, lunch, or scheduled breaks).

At step 305, the computer determines whether the song is appropriate for the target. When the song is provided from a queue of the playlist or the streaming site, computer uses the clock information, the current heart rate information, and the target of the heart rate and the blood pressure which is unique to the listener, the computer compares the information received at steps 302, 303, and 304 with the metadata collected for the queued song. In response to determining that the song is appropriate for the target (YES branch of step 305), at step 306, the computer plays the song. Otherwise, in response to determining that the song is not appropriate for the target (NO branch of step 305), at step 307, the computer skips the song.

Figure 4:
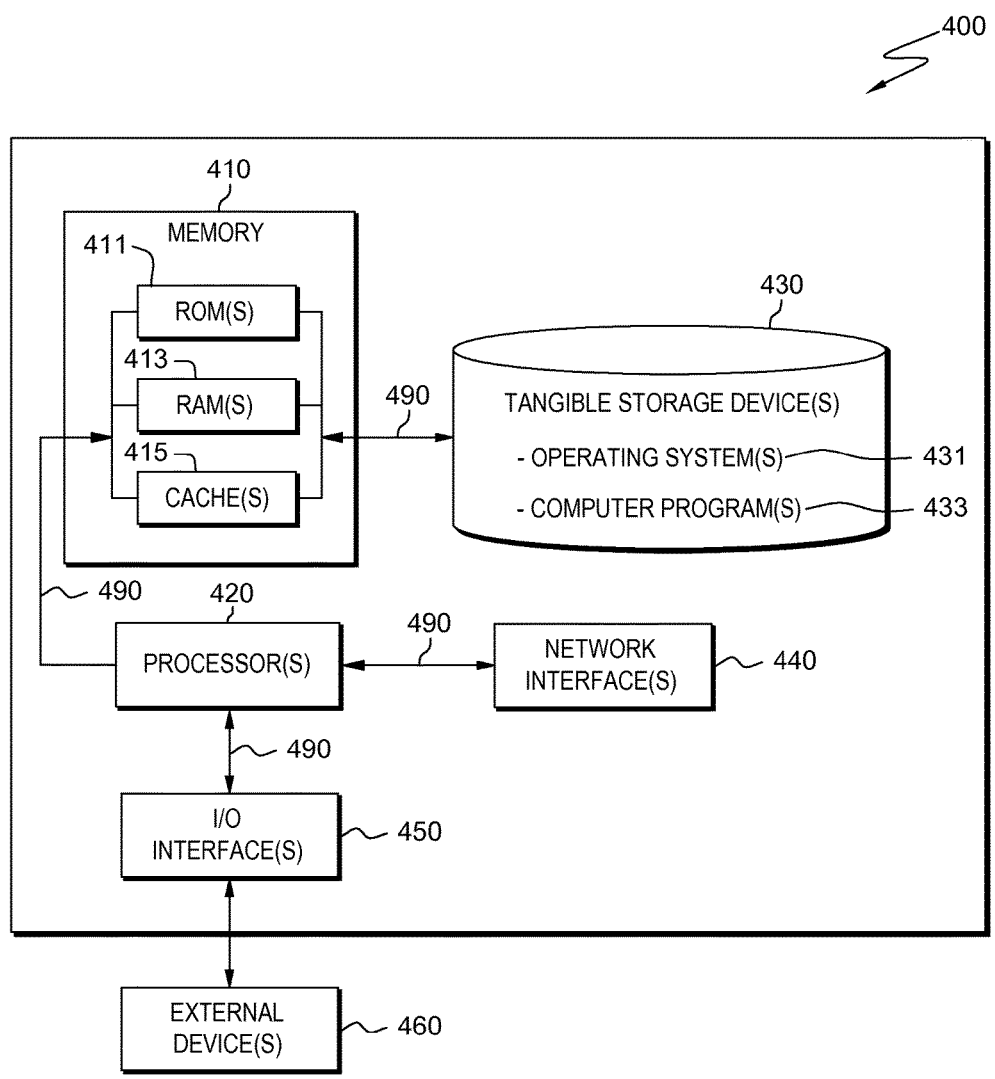
FIG. 4 is a diagram illustrating components of a computer device hosting a program for selecting a song using a heart rate change, a blood pressure change, and a face expression of a listener, in accordance with one embodiment of the present invention.

FIG. 4 is a diagram illustrating components of components of computer device 400 hosting a program for selecting a song using a heart rate and a face expression, in accordance with one embodiment of the present invention. It should be appreciated that FIG. 4 provides only an illustration of one implementation and does not imply any limitations with regard to the environment in which different embodiments may be implemented.

Referring to FIG. 4, computer device 400 includes processor(s) 420, memory 410, and tangible storage device(s) 430. In FIG. 4, communications among the above-mentioned components of computer device 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430. The one or more computer programs 433 include the program for selecting a song using a heart rate change, a blood pressure change, and a face expression. Computer device 400 further includes I/O interface(s) 450. I/O interface(s) 450 allows for input and output of data with external device(s) 460 that may be connected to computer device 400. Computer device 400 further includes network interface(s) 440 for communications between computer device 400 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for selecting songs using a heart rate change, a blood pressure change, and a facial expression of a listener, the method comprising:
    receiving, by a computer, a song from a music source selected by a listener;
    determining, by the computer, whether the song has been analyzed before;
    determining, by the computer, whether the song is appropriate based on a similar song that has been analyzed, in response to determining that the song has not been analyzed before;
    determining, by the computer, whether the song is appropriate, based on clock information, a current heart rate and a current blood pressure detected by a camera connected to the computer, and a target of a heart rate and a blood pressure for the listener, in response to determining that the song has been analyzed before;
    starting, by the computer, to play the song, in response to determining that the song is appropriate;
    detecting, by the camera connected to the computer, a facial expression of the listener;
    determining, by the computer, whether the facial expression is positive;
    skipping, by the computer, the song, in response to determining that the facial expression is not positive;
    playing, by the computer, the song in full, in response to determining that the facial expression is positive;
    detecting, by the camera connected to the computer, a heart rate change and a blood pressure change of the listener, wherein the heart rate change and the blood pressure change show differences of the heart rate and the blood pressure before and after listening to the song; and
    tagging, by the computer, the song with updated metadata of the song, wherein the update metadata of the song includes a musical analysis result, the heart rate change and the blood pressure change of the listener, and the facial expression of the listener.

2. The method of claim 1, for determining whether the song is appropriate, further comprising:
    receiving, by the computer, the clock information;
    receiving, by the computer, the current heart rate and the blood pressure of the listener;
    receiving, by the computer, the target of the heart rate and the blood pressure for the listener; and
    comparing, by the computer, the clock information, the current heart rate and the blood pressure, and the target of the heart rate and the blood pressure with previous metadata of the song so as to determine whether the song is appropriate for the target.

3. The method of claim 1, for tagging the song with the updated metadata of the song, further comprising:
    receiving, by the computer, the updated metadata of the song;
    determining, by the computer, whether there is previous metadata of the song, wherein the previous metadata of the song includes the musical analysis result, the heart rate change and the blood pressure change of the listener, and the facial expression of the listener;
    comparing, by the computer, the updated metadata of the song with the previous metadata of the song, in response to determining that there is the previous metadata of the song;
    analyzing, by the computer, the updated metadata of the song and the previous metadata of the song; and
    updating, by the computer, a database with the updated metadata of the song.

4. The method of claim 3, further comprising:
    comparing, by the computer, the updated metadata of the song with previous metadata of the similar song, in response to determining that there is no previous metadata of the song;
    analyzing, by the computer, the updated metadata of the song and the previous metadata of the similar song; and
    updating, by the computer, the database with the updated metadata of the song.

5. The method of claim 1, further comprising:
    in response to determining that the song is not appropriate, skipping, by the computer, the song; and
    tagging, by the computer, the song with the updated metadata.

* * * * *